United States Patent [19]
Krzystowczyk et al.

[11] Patent Number: 5,739,368
[45] Date of Patent: Apr. 14, 1998

[54] USE OF HEAT TREATED ALUMOXANES IN PREPARING SUPPORTED CATALYSTS

[75] Inventors: Niomi L. Krzystowczyk; Steven P. Diefenbach; Edward A. Burt, all of Baton Rouge, La.

[73] Assignee: Albemarle Corporation, Richmond, Va.

[21] Appl. No.: 644,764

[22] Filed: May 10, 1996

[51] Int. Cl.$^6$ .................................. C07F 5/06; C07F 17/00
[52] U.S. Cl. ...................... 556/187; 556/175; 556/179; 556/171; 556/182; 502/104; 502/117; 502/152; 526/160; 526/943
[58] Field of Search .................................. 556/171, 175, 556/179, 182, 187; 502/104, 117, 152; 526/160, 943

[56] References Cited

U.S. PATENT DOCUMENTS

| | | | |
|---|---|---|---|
| 5,001,205 | 3/1991 | Hoel | 526/128 |
| 5,227,440 | 7/1993 | Canich et al. | 526/129 |
| 5,229,478 | 7/1993 | Floyd et al. | 526/160 |
| 5,441,920 | 8/1995 | Welborn, Jr. | 502/103 |
| 5,602,067 | 2/1997 | Nowlin et al. | 502/104 |

*Primary Examiner*—Porfirio Nazario-Gonzalez
*Attorney, Agent, or Firm*—Philip M. Pippenger

[57] ABSTRACT

Alumoxane, and especially methylalumoxane, which provide supported metallocene and/or transition metal catalyst compositions having increased activity are prepared by heating the alumoxane prior to placing it on the support.

19 Claims, No Drawings

USE OF HEAT TREATED ALUMOXANES IN PREPARING SUPPORTED CATALYSTS

This invention relates generally to hydrocarbylalumoxane compositions and more specifically to improved supported alumoxane/metallocene olefin polymerization catalysts and their preparation.

Hydrocarbylalumoxanes complexed with transition metal compounds, such as metallocenes, have been found to be very effective olefin polymerization catalysts. Methylalumoxanes are especially effective catalyst components in forming both homogeneous and supported catalysts. We have found that the activity and other properties of such supported catalysts is improved by heat treating the methylalumoxanes prior to placing them on the support.

In accordance with this invention there is provided a process for preparing a supported alumoxane, said process comprising heat treating an alumoxane and placing the heat treated alumoxane on a support. A supported olefin polymerization catalyst is formed by also adding a transition metal compound such, as a metallocene, to the support.

Also provided are supported alumoxane and alumoxane containing catalyst compositions.

Hydrocarbylalumoxanes are formed by the partial hydrolysis of hydrocarbylaluminum compounds and, especially, trialkylaluminums such as trimethylaluminum.

Hydrocarbylalumoxanes may exist in the form of linear, cyclic, caged or polymeric structures with the simplest monomeric compounds being a tetraalkylalumoxane such as tetramethylalumoxane, $(CH_3)_2AlOAl(CH_3)_2$, or tetraethylalumoxane, $(C_2H_5)_2AlOAl(C_2H_5)_2$. The compounds preferred for use in olefin polymerization catalysts are oligomeric materials, sometimes referred to as polyalkylalumoxanes, which usually contain about 4 to 20 of the repeating units:

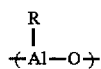

where R is $C_1$–$C_{10}$ alkyl and especially preferred are polymethylalumoxanes (MAOs). Although the linear and cyclic alumoxanes are often noted as having the structures

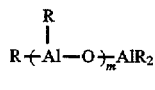

and

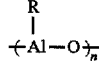

where m and n are integers of 4 or more, the exact configuration of the alumoxanes remains unknown.

Methylalumoxanes can contain some higher alkyl groups to improve their solubility. Such modified methylalumoxanes are described, for example, in U.S. Pat. No. 5,157,008. Besides MAO, non-limiting examples of hydrocarbylalumoxanes for use in the invention include ethylalumoxane (EAO), isobutylalumoxane (IBAO), n-propylalumoxane, n-octylalumoxane, and the like. The hydrocarbylalumoxanes can also contain up to about 20 mole percent (based on aluminum) of moieties derived from amines, alcohols, ethers, esters, phosphoric and carboxylic acids, thiols, alkyl disiloxanes and the like to improve their activity, solubility and/or stability.

The alumoxanes can be prepared as known in the art by the partial hydrolysis of trialkylaluminum compounds. The trialkylaluminum compounds can be hydrolyzed by reacting them with either free water or water containing solids, which can be either hydrates or porous materials which have absorbed water. Because it is difficult to control the reaction by adding water per se, even with vigorous agitation of the mixture, the free water is usually added in the form of a solution or a dispersion in an organic solvent. Suitable hydrates include salt hydrates such as, for example, $CuSO_4 \cdot 5H_2O$, $Al_2(SO_4)_3 \cdot 18H_2O$, $FeSO_4 \cdot 7H_2O$, $AlCl_3 \cdot 6H_2O$, $Al(NO_3)_3 \cdot 9H_2O$, $MgSO_4 \cdot 7H_2O$, $MgCl_2 \cdot 6H_2O$, $ZnSO_4 \cdot 7H_2O$, $Na_2SO_4 \cdot 10H_2O$, $Na_3PO_4 \cdot 12H_2O$, $LiBr \cdot 2H_2O$, $LiCl \cdot 1H_2O$, $LiI \cdot 2H_2O$, $LiI \cdot 3H_2O$, $KF \cdot 2H_2O$, $NaBr \cdot 2H_2O$ and the like and alkali metal or alkaline earth metal hydroxide hydrates such as, for example, $NaOH \cdot H_2O$, $NaOH \cdot 2H_2O$, $Ba(OH)_2 \cdot 8H_2O$, $KOH \cdot 2H_2O$, $CsOH \cdot 1H_2O$, $LiOH \cdot 1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4, with ratios of from about 4:3 to 1:3.5 being preferred.

Such hydrocarbylalumoxanes and processes for preparing hydrocarbylalumoxanes are described, for example, in U.S. Pat. Nos. 4,908,463; 4,924,018; 5,003,095; 5,041,583; 5,066,631; 5,099,050; 5,157,008; 5,157,137; 5,235,081; 5,248,801, and 5,371,260, whose entire teachings are incorporated herein by reference. The methylalumoxanes contain varying amounts, of from about 5 to 35 mole percent, of the aluminum value as unreacted trimethylaluminum. Preferably, the aluminum content as trimethylaluminum is less than about 23 mole percent of the total aluminum value, and, more preferably, less than about 20 mole percent.

Non-limiting examples of olefin polymerization catalysts include metallocenes and/or transition metal compounds. As used in the specification and claims, the term "metallocene" includes metal derivatives which contain at least one cyclopentadienyl moiety. Suitable metallocenes are well known in the art and include the metallocenes of Groups 3, 4, 5, 6, lanthanide and actinide metals, for example, the metallocenes which are described in U.S. Pat. Nos. 2,864,843; 2,983,740; 4,665,046; 4,874,880; 4,892,851; 4,931,417; 4,952,713; 5,017,714; 5,026,798; 5,036,034; 5,064,802; 5,081,231; 5,145,819; 5,162,278; 5,245,019; 5,268,495; 5,276,208; 5,304,523; 5,324,800; 5,329,031; 5,329,033; 5,330,948, 5,347,025; 5,347,026; and 5,347,752, whose teachings with respect to such metallocenes are incorporated herein by reference.

Non-limiting, illustrative examples of such metallocenes are bis(cyclopentadienyl)zirconium dimethyl, bis (cyclopentadienyl)zirconium dichloride, bis (cyclopentadienyl)zirconium monomethylmonochloride, bis (cyclopentadienyl)titanium dichloride, bis (cyclopentadienyl)titanium difluoride, cyclopentadienylzirconium tri-(2-ethylhexanoate), (biscyclopentadienyl)zirconium hydrogen chloride, bis (cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylenebis(indenyl)zirconium dichloride, ($\eta^5$-indenyl)hafnium trichloride, ($\eta^5$-$C_5Me_5$) hafnium trichloride, racemic dimethylsilanylene-bis (indenyl)thorium dichloride, racemic dimethylsilanylene-bis(4,7-dimethyl-1-indenyl)zirconium dichloride, racemic dimethylsilanylene-bis(indenyl)uranium dichloride, racemic dimethylsilanylene-bis(2,3,5-trimethyl-1-cyclopentadienyl) zirconium dichloride, racemic dimethylsilanylene(3-methyl-cyclopentadienyl)hafnium dichloride, racemic dimethylsilanylene-bis(1-(2-methyl-4-ethyl)indenyl) zirconium dichloride; racemic dimethylsilanylene-bis(2-methyl-4,5,6,7-tetrahydro-1-indenyl)-zirconium dichloride, bis(pentamethylcyclopentadienyl)thorium dichloride, bis(pentamethylcyclopentadienyl)uranium dichloride, (tert-butylamido)dimethyl(tetramethyl-$\eta^5$-cyclopentadienyl) silanetitanium dichloride, (tert-butylamido)dimethyl (tetramethyl-$\eta^5$-cyclopentadienyl)silanechromium dichloride, (tert-butylamido)dimethyl(-$\eta^5$-cyclopentadienyl)silanetitanium dichloride, (tert-butylamido)-dimethyl(tetramethyl-$\eta^5$-cyclopentadienyl) silanemethyltitanium bromide, (tert-butylamido) (tetramethyl-$\eta^5$-cyclopentadienyl)-1,2-ethanediyluranium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylcerium dichloride, (methylamido)(tetramethyl-$\eta^5$-cyclopentadienyl)-1,2-ethanediyltitanium dichloride, (ethylamido)(tetramethyl-$\eta^5$-cyclopentadienyl) methylenetitanium dichloride, (tert-butylamido)dibenzyl (tetramethyl-$\eta^5$-cyclopentadienyl)-silanebenzylvanadium chloride, (benzylamido)dimethyl(indenyl)silanetitanium dichloride, and (phenylphosphido)dimethyl-(tetramethyl-$\eta^5$-cyclopentadienyl)silanebenzyltitanium chloride.

Suitable transition metal compounds include the well known Ziegler-Natta catalyst compounds of Group 4–6 metals. Non-limiting illustrative examples of such transition metals include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_{17})_2Br_2$, $VCl_4$, $VOCl_3$ $VO(OC_2H_5)_3$, $ZrCl_4$, $ZrCl_3(OC_2H_5)$, $Zr(OC_2H_5)_4$ and $ZrCl(OC_4H_9)_3$ and the like.

As known in the art the solid support can be any particulate solid, and particularly porous supports. Non-limiting examples include talc, magnesium halides, zoolites, inorganic oxides, and resinous support material such as polyolefins. A preferred support material is an inorganic oxide in finely divided form. Such inorganic oxide support materials include Group IIA, IIIA, IVA or IVB metal oxides such as silica, alumina, silica-alumina and mixtures thereof. Other inorganic oxides that may be employed either alone or in combination with the silica, alumina or silica-alumina are magnesia, titania, zirconia, and the like. Other suitable support materials are finely divided polyolefins such as finely divided polyethylene.

The specific particle size, surface area, pore diameter, pore volume, etc. of the support materials are selected as known in the art. For example, particle sizes of from about 0.1 to 600 micrometers, surface area of from about 50 to 1000 m²/g, pore diameters of from about 50–500 angstroms and pore volumes of from about 0.3 to 5.0 cc/g. The supports can be dehydrated either chemically or by heating at temperatures of from about –100° to 1000° C. in a dry inert gas for 1–24 hours as is known in the art.

In one aspect of the invention, the heat treated alumoxane is combined with the support in the presence of an inert organic solvent. The dry support can be added to a solution of the alumoxane or vice versa. Alternatively, the alumoxane can be combined with a solvent slurry of the carrier. The coating temperature and pressure is not critical and ambient conditions can be used but, preferably the temperature is maintained at from about 25° to 250° C., more preferably 60° to 150° C., and the pressure at from about 5 to 500 psig, preferably 5 to 50 psig, such as by using a closed system. An inert gas can be used to further increase the pressure.

Non-limiting examples of organic solvents for use in the process include aliphatic hydrocarbons such as pentane, isopentane, hexane, cyclohexane, heptane, octane, decane, dodecane, hexadecane, octadecane and the like, with those having carbon numbers of 5 to 10 being preferred, and aromatic hydrocarbons such as benzene, chlorobenzene, toluene, xylene, cumene and the like, with those having carbon numbers of 6 to 20 being preferred. The aromatic solvents are preferred. The amount of solvent used is not critical and is generally chosen to be from about 0.5 to 50, preferably 5 to 50 times, the total weight of coating material and carrier.

The olefin polymerization catalyst can be combined with the support either before, after or simultaneously with the alumoxane. The catalyst can also be pre-reacted with the alumoxane.

The total loading of the catalyst system components on the support and the relative proportions of catalyst materials can vary over a wide range and are chosen based on the particular materials and the polymerization application which are involved. For example, transition metal catalysts are usually employed in amounts of from about 0.01 to 10 mmoles/g of support and the catalyst components are generally used in proportions to provide mole ratios of metal atom in the catalyst to aluminum atom in the alumoxane of from about 0.0002:1 to 0.2:1, although greater or lesser amounts can be used.

The supported catalyst systems which are prepared according to the process of the invention are useful in producing olefin polymers and especially ethylene polymers, propylene polymers, ethylene/a-olefin copolymers, styrene polymers and copolymers and the like.

In accordance with the invention, a solution of the hydrocarbylalumoxane is heat treated at a temperature of at least about 35° C. and preferably from about 45° to 150° C. for at least about 0.5 hour and preferably from 1 to 20 hours prior to applying it to the support.

The invention is further illustrated by, but is not intended to be limited to, the following examples.

EXAMPLE 1

Approximately 600 grams of a clear, 30% by weight solution of methylalumoxane (MAO) in toluene was transferred under nitrogen to a clean, dry, 2 liter reactor which was equipped with an agitator. The agitator was turned on and heated to a temperature of 55° C. by means of a circulating oil heating bath. Samples were taken at 1 hour, 3 hours and 7 hours after the reactor reached 55° C. No gel or any appreciable hazing of the MAO solution was observed either fight after the samples were taken or after being stored in a freezer for one week. Any slight hazing disappeared after the samples were warmed to room temperature.

EXAMPLE 2

Example 1 was repeated, except that the treating temperature was 85° C. The seven hour sample showed a slight hazing but no gel appeared. After storage in a freezer, some gel appeared in the seven hour sample. The hazing and gel disappeared after the samples were warmed to room temperature.

EXAMPLE 3

Example 1 was repeated, except that the treating temperature was 80° C. with no agitation. After 8 hours a slight hazing was observed. At 36 hours, a second, clear layer was formed at the top of the reactor (approximately 1–2-deep) but the bulk of the material was not gelled. The material was removed after 46 hours of heating and stored in a freezer.

PREPARATION OF SUPPORTED CATALYSTS

Supported catalysts were prepared by placing 18.6 gram samples of the heat treated MAO on 11.1 grams of vacuum dried (200° C.) silica along with 0.62 grams of the metallocene catalyst using 87 grams of toluene as the solvent. After several washes, the dried catalyst product recovery was from 16.4 to 16.9 grams.

POLYMERIZATION ACTIVITY TESTING

Samples of the supported catalysts were used to polymerize ethylene in accordance with the following procedure.

The reactor is heated to 130° C., under a flow of nitrogen, for at least 1 hour prior to polymerization. The reactor is then sealed and purged three times with high pressure nitrogen and cooled to 81.5° C. Isobutane (500 mL) is then added to the reactor and the temperature is controlled at 81.5° C. Ethylene is then added to the reactor to bring the total pressure to 300 psig. The catalyst is prepared in the drybox, by weighing out 25 mg catalyst into the barrel of a syringe. The plunger is replaced. 1 mL of a 25% (w/w) of TIBA in toluene is added to the reactor. A 14 gauge needle is added to the end of the catalyst syringe and is then stuck into a septum sealed vial. Hexene (6.75 g) is weighed into a syringe, needle added, and stored in the same sealed bottle. The hexene is then added to the reactor through the catalyst addition bomb and rinsed in with approximately 250 mL of isobutane. The catalyst is then added in a similar fashion and rinsed in with the remaining isobutane. The pressure of the reactor is increased to 430 psig and maintained there feeding ethylene on demand. Once the temperature gets back to 81.5° C., the polymerization is timed for 1 hour. When the polymerization is complete, the isobutane and ethylene are vented off, the reactor is opened, and the polymer is scooped out. The polymer is then weighed and the activity calculated.

The tests were compared with two samples of methylalumoxane which had not been heat treated. The results are shown in Table 1.

TABLE 1

| Sample ID[1] | 1A | 1B | 1C | 3A | 3B | Comp. 1 | Comp. 2 |
|---|---|---|---|---|---|---|---|
| Grams Sample | 24 | 25 | 25 | 24 | — | — | — |
| Rxn Time | 45 | 60 | 55 | 50 | 60 | 40 | 60 |
| Activity | 6733 | 7370 | 7529 | 6294 | 7215 | 6963 | 6060 |
| Fouling | None | None | None | None | — | — | — |
| Morphology | Good | Good | Good | Good | — | — | — |
| Bulk Density gm/ml | .357 | .353 | .352 | .362 | — | — | — |

[1]1A, 1B, 1C Example 1 samples (55° C.) where A = 1 hr, B = 3 hr, and C = 7 hr samples
3A, 3B Example 3 samples (85° C.) where A = 1 hr, and B = 3 hr samples The results show that up to about a 25 percent increase in activity over the comparisons could be achieved by using the process of the invention, depending upon the heating time and temperature.

The process of heat treatment is believed to provide a more stable MAO product. MAO is found to gel after time under normal storage conditions and more quickly at elevated temperatures. The formation of gel leads to variabilities in performance and unfeasible processing in plants. The process of heat treatment reduces the amount of gel formation and increases the activity of supported catalysts produced using the pretreated MAO products of the invention.

What is claimed is:

1. A process for preparing a supported alumoxane, said process comprising heat treating an alumoxane and placing the heat treated alumoxane on a support.

2. The process of claim 1 wherein said alumoxane is a methylalumoxane.

3. The process of claim 2 wherein an organic solvent solution of said methylalumoxane is heat treated at a temperature of at least about 35° C. for at least about 0.5 hour.

4. The process of claim 3 wherein the heat treatment is from about 45° to 150° C. for about 1 to 20 hours.

5. The process of claim 1 wherein a metallocene and/or a transition metal catalyst composition is also placed upon said support so as to prepare a supported catalyst.

6. The process of claim 5 wherein a metallocene is placed upon said support.

7. The process of claim 1 wherein said support comprises silica particles.

8. A supported catalyst comprising an olefin polymerization catalyst and an alumoxane, said alumoxane, prior to being used in forming the supported catalyst, having been heat treated for a time and at a temperature such that said catalyst has increased activity as compared to a corresponding catalyst made from alumoxane which has not been heat treated.

9. The supported catalyst of claim 8 wherein said olefin polymerization catalyst is a metallocene.

10. The supported catalyst of claim 9 wherein said alumoxane is a methylalumoxane.

11. The supported catalyst of claim 10 wherein an organic solvent solution of said methylalumoxane is heat treated and then mixed with said support.

12. The supported catalyst of claim 10 wherein said catalyst has an activity of at least 7215.

13. The process of claim 1 wherein said alumoxane is an alkylalumoxane.

14. The process of claim 2 wherein said methylalumoxane being heat treated contains from about 5 to about 35 mole percent of the aluminum value as unreacted trimethylaluminum.

15. The process of claim 14 wherein less than about 20 mole percent of the aluminum value is unreacted trimethylaluminum.

16. The process of claim 3 wherein said methylalumoxane is heat treated for at least about 3 hours.

17. The process of claim 1 wherein said support is a dehydrated, porous particulate support.

18. The process of claim 17 wherein said support is a silica support.

19. The supported catalyst of claim 8 wherein the heat treatment is at a temperature of from about 55° C. to about 85° C. for at least 3 hours.

* * * * *